US012416282B2

(12) United States Patent
Lorenz

(10) Patent No.: US 12,416,282 B2
(45) Date of Patent: Sep. 16, 2025

(54) METHOD AND APPARATUS TO CONTROL AN IGNITION SYSTEM

(71) Applicant: BORGWARNER LUXEMBOURG AUTOMOTIVE SYSTEMS S.A., Bascharage (LU)

(72) Inventor: Frank Lorenz, Trier (DE)

(73) Assignee: BORGWARNER LUXEMBOURG AUTOMOTIVE SYSTEMS S.A., Bascharage (LU)

( * ) Notice: Subject to any disclaimer, the term of this patent is extended or adjusted under 35 U.S.C. 154(b) by 250 days.

(21) Appl. No.: 18/246,482

(22) PCT Filed: Oct. 1, 2021

(86) PCT No.: PCT/EP2021/077203

§ 371 (c)(1),
(2) Date: Mar. 23, 2023

(87) PCT Pub. No.: WO2022/069753

PCT Pub. Date: Apr. 7, 2022

(65) Prior Publication Data

US 2023/0358200 A1 Nov. 9, 2023

(30) Foreign Application Priority Data

Oct. 1, 2020 (GB) ...................................... 2015565

(51) Int. Cl.
*F02P 3/04* (2006.01)
*F02P 15/10* (2006.01)
(Continued)

(52) U.S. Cl.
CPC ............. *F02P 3/0442* (2013.01); *F02P 15/10* (2013.01); *H01F 7/064* (2013.01); *H01F 38/12* (2013.01)

(58) Field of Classification Search
CPC ......... F02P 3/0442; F02P 15/10; H01F 7/064; H01F 38/12
See application file for complete search history.

(56) References Cited

U.S. PATENT DOCUMENTS

2019/0162155 A1* 5/2019 Frank ...................... F02P 3/053

FOREIGN PATENT DOCUMENTS

EP 2325476 A1 5/2011
EP 2873850 A1 5/2015
(Continued)

OTHER PUBLICATIONS

International Search Report and Written Opinion in International Application No. PCT/EP2021/077203, dated Jan. 18, 2022 (8 pages).

*Primary Examiner* — Scott Bauer
(74) *Attorney, Agent, or Firm* — Joshua M. Haines; Bookoff McAndrews, PLLC

(57) ABSTRACT

A multi-charge ignition system including a spark plug control unit (13) adapted to control at least two coil stages so as to successively energise and de-energise said coil stage(s) to provide a current to a spark plug, said two stages comprising a first transformer (T1) including a first primary winding (L1) inductively coupled to a first secondary winding (L2); a second transformer (T2) including a second primary winding (L3) inductively coupled to a second secondary winding (L4); a first switch Q1 electrically connected between the low side of the first primary winding L1 and the low side/earth, a second switch Q2 having a connection to the low side of the second primary winding L3; and including a first diode D1 electrically connected between the low side of said first secondary winding L3 and ground, and a second diode D2 connected to a point between the low side of said second secondary winding L4 and ground and, including means to measure the voltage at a first
(Continued)

connection point (203*a*) between the first switch and the low side of L1 and/or the voltage at a second connection (203*b*) point between the second switch and the low side of L3; and means to control the operation of the system dependent upon said measured voltages.

21 Claims, 15 Drawing Sheets

(51) Int. Cl.
*H01F 7/06* (2006.01)
*H01F 38/12* (2006.01)

(56) References Cited

FOREIGN PATENT DOCUMENTS

| | | | |
|---|---|---|---|
| JP | 2002004995 | A | 1/2002 |
| WO | 2017/178436 | A1 | 10/2017 |

* cited by examiner

| CONTROL CHART | SWITCH | | | | | | FOLLOWING STATE(S) POSSIBLE |
|---|---|---|---|---|---|---|---|
| STATE | Q1 | Q2 | M1 | M2 | M3 | | |
| MAIN | 0 | 0 | 0 | 0 | 0 | | INITIAL CHARGE |
| INITIAL CHARGE | 1 | 1 | 0 | 0 | 1 | | INITIAL CHARGE/HV BREAKDOWN |
| INITIAL CHARGE / HV-HV BREAKDOWN | 0 | 0 | 0 | 0 | 0 | | MultigbtNxt-Q1 ON |
| MultiIgbtNxt -Q1 ON | 1 | 0 | 1 | 0 | 0 | | MultigbtXLoop (NOT SHOWN HERE => CONTROL LOOP) |
| MultiIgbtNxt -Q2 ON | 0 | 1 | 0 | 1 | 0 | | MultigbtXLoop (NOT SHOWN HERE => CONTROL LOOP) |
| IpmaxStepDown - Q1 ON | 1 | 0 | T | 1 | T | DETAILS SEE BELOW | SUBPROGRAM OF MultigbtXLoop |
| IpmaxStepDown - Q2 ON | 0 | 1 | 1 | T | T | | SUBPROGRAM OF MultigbtXLoop |
| | | | | | | | |
| | | | | | | | |
| | | | | | | | |
| IpmaxStepDown - Q1 ON | Q1 | Q1 | Q1 | Q1 | Q1 | TIME (US) E.G. | |
| | 1 | 0 | 0 | 1 | 1 | 0 | |
| | 1 | 0 | 1 | 1 | 0 | 16 | |
| | 1 | 0 | 0 | 1 | 1 | 32 | |
| | ••• | ••• | ••• | ••• | ••• | | |

Fig. 5

METHOD AND APPARATUS TO CONTROL AN IGNITION SYSTEM

CROSS-REFERENCE TO RELATED APPLICATION(S)

This application is a U.S. National Stage Application and claims the benefit of priority to International Application No. PCT/EP2021/077203, filed Oct. 1, 2021, which claims priority to GB Application No. 2015565.1, filed Oct. 1, 2020.

TECHNICAL FIELD

The present invention relates to an ignition system and method of controlling spark plugs. It has particular but not exclusive application to systems which are adapted to provide a continuous spark, such as a multi-spark plug ignition system.

BACKGROUND OF THE INVENTION

Ignition engines that use very lean air-fuel mixtures have been developed, that is, having a higher air composition to reduce fuel consumption and emissions. In order to provide a safe ignition it is necessary to have a high energy ignition source. Prior art systems generally use large, high energy, single spark ignition coils, which have a limited spark duration and energy output. To overcome this limitation and also to reduce the size of the ignition system multi-charge ignition systems have been developed. Multi-charge systems produce a fast sequence of individual sparks, so that the output is a long quasi-continuous spark The Applicants patent application EP 17716869.7 describes a method and apparatus of operation of a CMC system.

Here, and in more conventional art, the protection of the diodes in the circuitry is performed via direct measurement. This direct measurement requires high voltage resistors, that must be placed inside epoxy and must be accessed via connections to the electronic assembly board. It is not ideal for such resistors to be located in hard epoxy resin, which makes them liable to the risk of failure. A further disadvantage is that production of the circuitry requires an additional process step in production. In addition it requires two additional connections between the electronic and the transformer It is an object of the invention to provide improved circuitry which overcomes the aforesaid problems.

In one aspect is provided a multi-charge ignition system including a spark plug control unit (13) adapted to control at least two coil stages so as to successively energise and de-energise said coil stage(s) to provide a current to a spark plug, said two stages comprising a first transformer (T1) including a first primary winding (L1) inductively coupled to a first secondary winding (L2); a second transformer (T2) including a second primary winding (L3) inductively coupled to a second secondary winding (L4); a first switch Q1 electrically connected between the low side of the first primary winding L1 and the low side/earth, a second switch Q2 having a connection to the low side of the second primary winding L3; and including a first diode D1 electrically connected between the low side of said first secondary winding L3 and ground, and a second diode D2 connected to a point between the low side of said second secondary winding L4 and ground and, including means to measure the voltage at a first connection point (203*a*) between the first switch and the low side of L1 and/or the voltage at a second connection (203*b*) point between the second switch and the low side of L3; and means to control the operation of the system dependent upon said measured voltages.

The system may include comparator means adapted to compare the voltages at said first and/or second connection points with threshold values.

Said first switch may comprise a first transistor Q1, the collector and emitter of which are connected between the low side of L1 and ground, Said second switch may comprise a second transistor, the collector and emitter of which are connected between the low side of L3 and ground.

The collector of said first transistor may be connected to said low side of L1, said first connection point being located therebetween, and/or the collector of said second transistor is connected to said low side of L3, said second connection point being located therebetween.

Said second switch Q2 may be connected between the low side of L3 and a control unit.

Either or both of said connection points may be connected to comparator means.

Said comparator means may be adapted to compare the voltages at said first and/or second connection points with threshold values.

Said threshold value(s) are preferably in the region of Udthmax/ue), where Udthmax is and ue is ue winding ratio between secondary and primary windings of the corresponding transformer to which the corresponding diode is directly connected to, and $U_{dthmax}$=high voltage diode switching threshold of that diode.

The system may include a third switch M1 connected between a power supply and the high side of the first primary winding L1.

The system may include a fourth switch M2 electrically connected between the second switch (e.g. emitter thereof) and ground, and a fifth switch M3 electrically connected between a point between the second switch Q2 and the fourth switch M2, and a point between third switch M1 and the high side of said first primary coil.

The system may be configured such that if the measured voltage at one or more of said first or second connection points is higher than said threshold, the system is configured to perform any of: recharge one or both transformers; discharge one or both transformers; recharge/discharge one transformer and put the other in a freewheeling state; put both transformed into a freewheeling state.

In a further aspect is provided method of controlling a multi-charge ignition system, said system including a spark plug control unit adapted to control at least two coil stages so as to successively energise and de-energise said coil stage(s) to provide a current to a spark plug, said two stages comprising a first transformer (T1) including a first primary winding (L1) inductively coupled to a first secondary winding (L2); a second transformer (T2) including a second primary winding (L3) inductively coupled to a second secondary winding (L4); a first switch Q1 electrically connected between the low side of the first primary winding L1 and low side/earth, a second switch Q2 connected to the low side of the second primary winding L3; and including a first diode D1 located between the low side of said first secondary winding L2 and ground; and a second diode D2 connected to a point between the low side of said second secondary winding L4 and ground and, said method comprising:

a) measuring the voltage at a first connection point (203*a*) between the first switch and the low side of L1 and/or the voltage at a second connection point (203*b*) between the second switch and the low side of L3;

b) controlling the operation of the system dependent upon said measured voltages.

The method may include the step of comparing the voltages at said first and/or second connection points with threshold values.

The first switch may comprises a first transistor, the collector and emitter of which are connected between the low side of L1 and ground.

Said second switch may comprise a second transistor, the collector and emitter of which are connected between the low side of L3 and ground.

The collector of said first transistor may be connected to said low side of L1, said first connection point being located therebetween, and/or the collector of said second transistor is connected to said low side of L3, said second connection point being located therebetween.

Said second switch Q2 may be connected between the low side of L3 and a control unit.

There may be a third switch M1 connected between the battery and the high side of the first primary winding L1.

There may be a fourth switch M2 located between the second switch (e.g. emitter thereof) and ground, and a fifth switch M3 electrically connected between a point between the second switch Q2 and the fourth switch M2, and a point between third switch M1 and the high side of said first primary coil.

Said threshold value(s) are preferably in the region of Udthmax/ue), where Udthmax is and ue is ue winding ratio between secondary and primary windings of the corresponding transformer to which the corresponding diode is directly connected to, and $U_{dthmax}$=high voltage diode switching threshold of that diode.

Step b) may comprise determining if the measured voltage at one or more of said first or second connection points is higher than said threshold, then controlling the system to perform any of: recharge one or both transformers; discharge one or both transformers; recharge/discharge one transformer and put the other in a freewheeling state; put both transformed into a freewheeling state.

Step a) may be implemented during CMC mode only after a pre-set blank time after toggling of the transformer occurs.

The phrase e.g. "connected to a point between the low side of said second secondary winding L4 and ground" should be interpreted as including cases where there is e.g. a resistor(s) between the diode connection and ground.

BRIEF DESCRIPTION OF DRAWINGS

The invention will now be described by way of example and with reference of the following drawings of which:

FIG. 5 shows an operational table;

PRIOR ART

Figure 1:
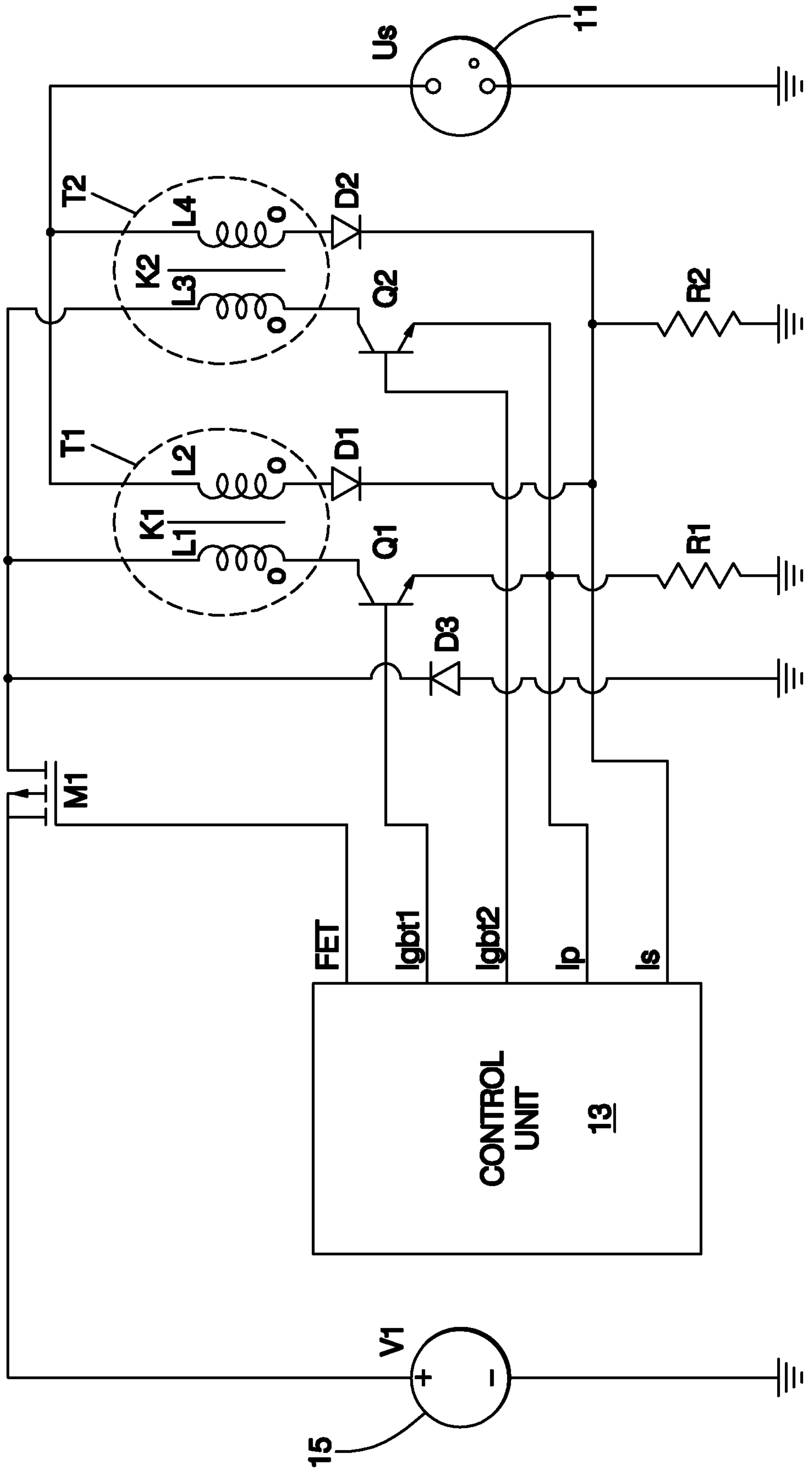
FIG. 1 shows the circuitry of a prior art coupled-multi-charge ignition system.

FIG. 1 shows the circuitry of a prior art coupled-multi-charge ignition system for producing a continuous ignition spark over a wide area of burn voltage servicing a single set of gapped electrodes in a spark plug 11 such as might be associated with a single combustion cylinder of an internal combustion engine (not shown). The CMC system uses fast charging ignition coils (L1-L4), including primary windings, L1, L2 to generate the required high DC-voltage. L1 and L2 are wound on a common core K1 forming a first transformer (coil stage) and secondary windings L3, L4 wound on another common core K2 are forming a second transformer (coil stage). The two coil ends of the first and second primary 20 windings L1, L3 may be alternately switched to a common ground such as a chassis ground of an automobile by electrical switches Q1, Q2. These switches Q1, Q2 are preferably Insulated Gate Bipolar Transistors. Resistor R1 may be optionally present for measuring the primary current Ip that flows from the primary side and is connected between the switches Q1, Q2 and ground, while optional resistor R2 for measuring the secondary current Is that flows from the secondary side is connected between the diodes D1, D2 and ground.

The low-voltage ends of the secondary windings L2, L4 may be coupled to a common ground or chassis ground of an automobile through high-voltages diodes D1, D2. The high-voltage ends of the secondary ignition windings L2, L4 are coupled to one electrode of a gapped pair of electrodes in a spark plug 11 through conventional means. The other electrode of the spark plug 11 is also coupled to a common ground, conventionally by way of threaded engagement of the spark plug to the engine block. The primary windings L1, L3 are connected to a common energizing potential which may correspond to conventional automotive system voltage in a nominal 12V automotive electrical system and is in the figure the positive voltage of battery. The charge current can be supervised by an electronic control circuit 13 that controls the state of the switches Q1, Q2. The control circuit 13 is for example responsive to engine spark timing (EST) signals, supplied by the ECU, to selectively couple the primary windings L1 and L2 to system ground through switches Q1 and Q2 respectively controlled by signals Igbt1 and Igbt2, respectively. Measured primary current Ip and secondary current Is may be sent to control unit 13. Advantageously, the common energizing potential of the battery 15 is coupled by way of an ignition switch M1 to the primary windings L1, L3 at the opposite end that the grounded one. Switch M1 is preferably a MOSFET transistor. A diode D3 or any other semiconductor switch (e.g. MOSFET) is coupled to transistor M1 so as to form a step-down converter. Control unit 13 is enabled to switch off switch M1 by means of a signal FET. The diode D3 or any other semiconductor switch will be switched on when M1 is off and vice versa.

In prior art operation, the control circuit 13 is operative to provide an extended continuous high-energy arc across the gapped electrodes. During a first step, switches M1, Q1 and Q2 are all switched on, so that the delivered energy of the power supply 15 is stored in the magnetic circuit of both transformers (T1, T2). During a second step, both primary windings are switched off at the same time by means of switches Q1 and Q2. On the secondary side of the transformers a high voltage is induced and an ignition spark is created through the gapped electrodes of the spark plug 11.

During a third step, after a minimum burn time wherein both transformers (T1, T2) are delivering energy, switch Q1 is switched on and switch Q2 is switched off (or vice versa). That means that the first transformer (L1, L2) stores energy into its magnetic circuit while the second transformer (L3, L4) delivers energy to spark plug (or vice versa). During a fourth step, when the primary current Ip increases over a limit (Ipmax), the control unit detects it and switches transistor M1 off. The stored energy in the transformer (L1, L2 or L3, L4) that is switched on (Q1, or Q2) impels a current over diode D3 (step-down topology), so that the transformer cannot go into the magnetic saturation, its energy being limited. Preferably, transistor M1 will be permanently switched on and off to hold the energy in the transformer on a constant level. During a fifth step, just after the secondary current Is falls short of a secondary current threshold level (Ismin) the switch Q1 is switched off and the switch Q2 is switched on (or vice versa). Then steps 3 to 5 will be iterated by sequentially switching on and off switches Q1 and Q2 as long as the control unit switches both switches Q1 and Q2 off.

Figure 2:
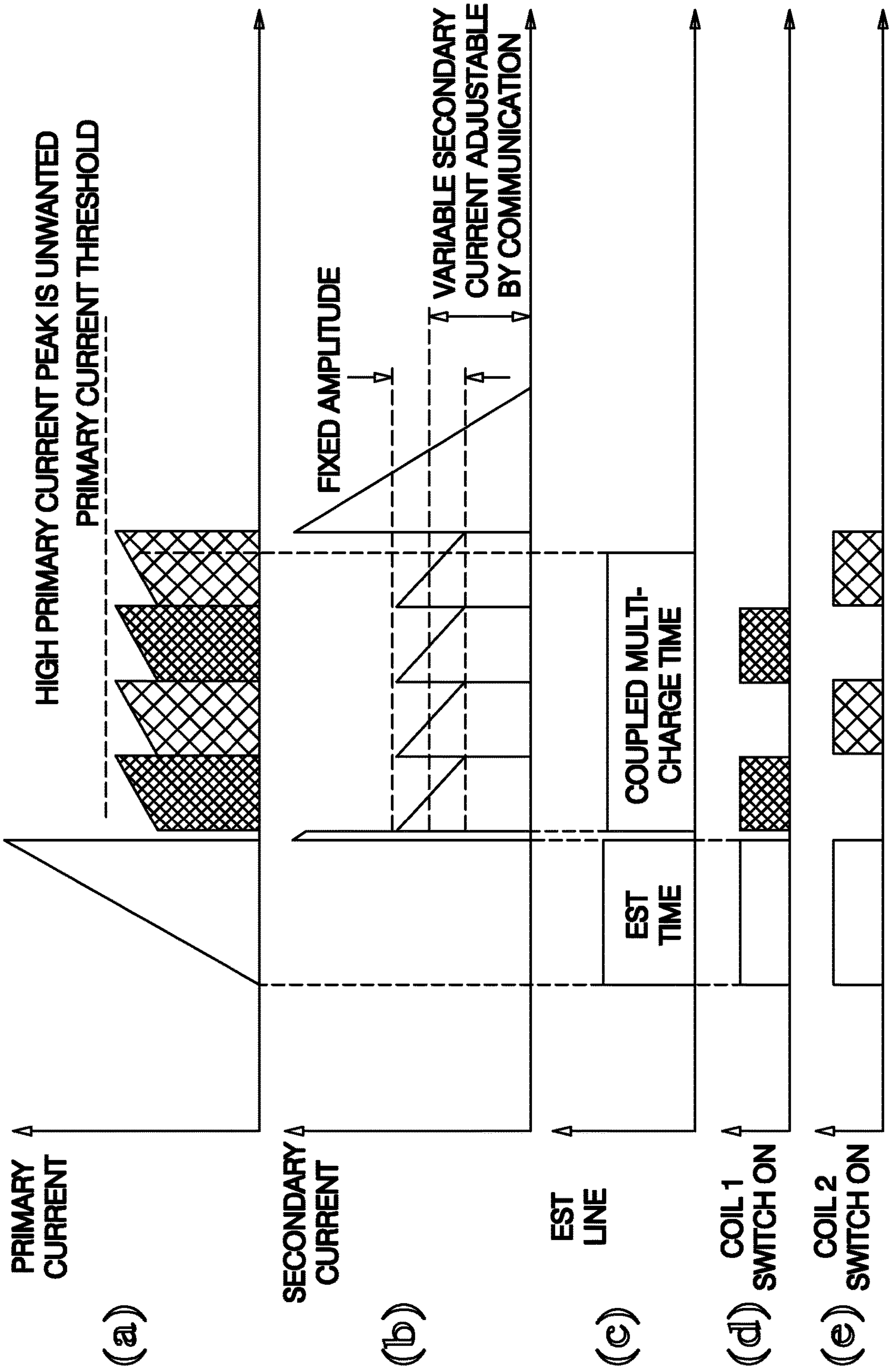
FIG. 2 shows timeline of the FIG. 1 systems for primary and secondary current, EST signal and coil 1 switch and coil 2 switch "on" times.

FIG. 2 shows timeline of ignition system current; FIG. 2*a* shows a trace representing primary current Ip along time. FIG. 2*b* shows the secondary current Is. FIG. 2*c* shows the signal on the EST line which is sent from the ECU to the ignition system control unit and which indicates ignition time. During step 1, i.e. M1, Q1 and Q2 switched on, the primary current Ip is increasing rapidly with the energy storage in the transformers. During step 2, i.e. Q1 and Q2 switched off, the secondary current Is is increasing and a high voltage is induced so as to create an ignition spark through the gapped electrodes of the spark plug. During step 3, i.e. Q1 and Q2 are switched on and off sequentially, so as to maintain the spark as well as the energy stored in the transformers. During step 4, comparison is made between primary current Ip and a limit Ipth. When Ip exceeds Ipth M1 is switched off, so that the "switched on" transformer cannot go into the magnetic saturation, by limiting its stored energy. The switch M1 is switched on and off in this way, that the primary current Ip is stable in a controlled range. During step 5, comparison is made between the secondary current Is and a secondary current threshold level Isth. If Is<Isth, Q1 is switched off and Q2 switched on (or vice versa). Then steps 3 to 5 will be iterated by sequentially switching on and off Q1 and Q2 as long as the control unit switches both Q1 and Q2 off. Because of the alternating charging and discharging of the two transformers the ignition system delivers a continuous ignition fire. The above describes the circuitry and operation of a prior art ignition system to provide a background to the current invention. In some aspects of the invention the above circuitry can be used. The invention provides various solutions to enhance performance and reduce spark-plug wear. FIGS. 2*d* and *e* show the operating states of the respective coils by virtue of the switch on and off times.

Figure 3A:
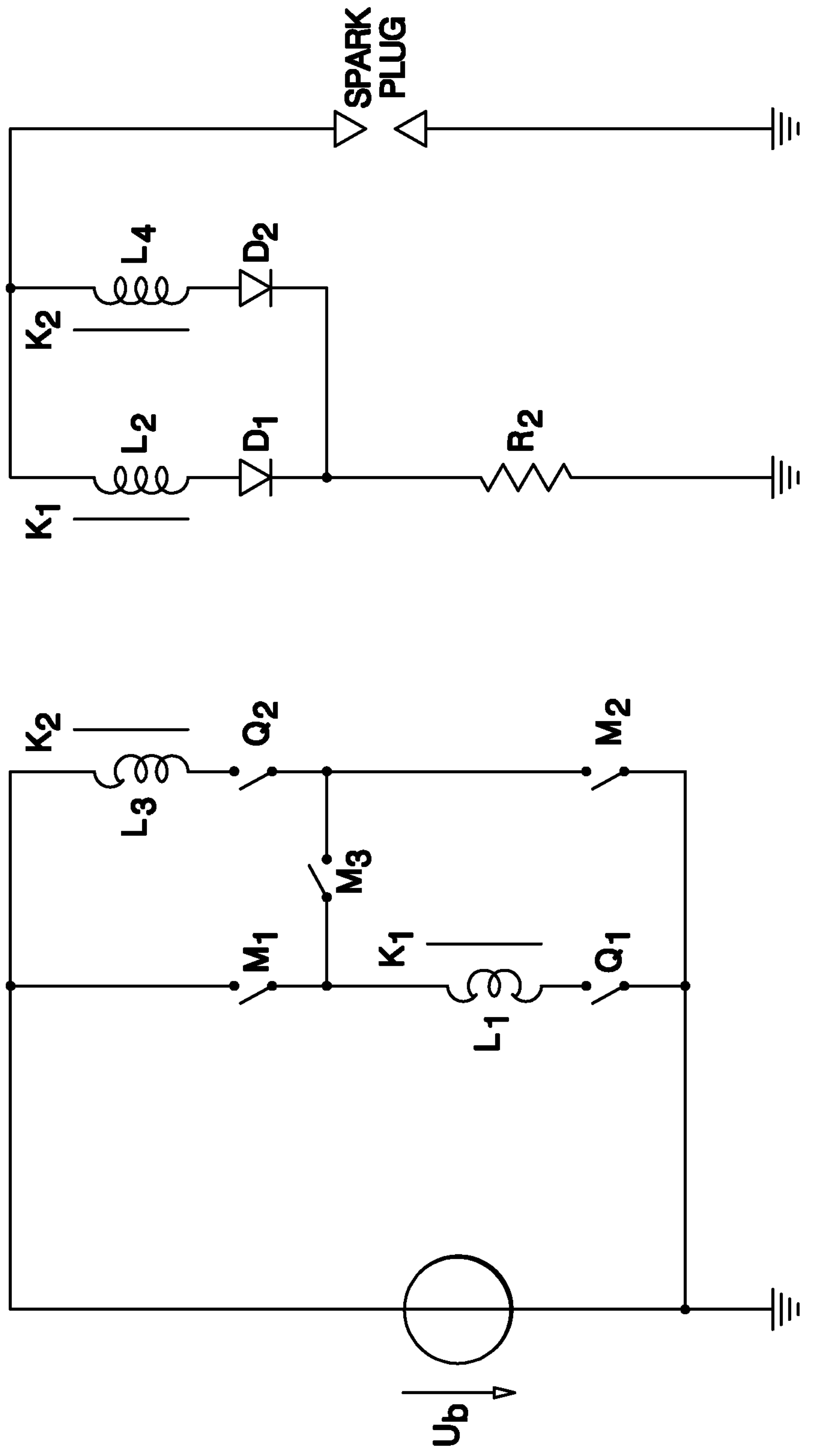
FIG. 3*a* shows a circuit of a coupled multi-charge system according to one example.

FIG. 3*a* shows an alternative schematic circuit—it is similar to that of FIG. 1. In order for enhanced clarity the primary side of the circuit is shown separately to the secondary side of the circuit e.g. the primary coils are shown separate from the secondary coils. It is to be understood however that the two cores shown in the figure K1 and K2 are each represented twice but in reality there is only one of each; inductor coils L1 and L2 share the same common core K1 and L3 and L4 share the same common core K2.

In the example a power switch M1 is located similarly arranged to M1 in the FIG. 1. This switch is located between the power e.g. battery high side and the high side of the coil L1. Low sides of the inductor coils L1 and L3 are connected through ground via switches Q1 and Q2. A further power switch is connected between the high side of inductor L1 and the low side of inductor L3. A further power switch M2 connects the switch Q2 to earth.

On the secondary side the two secondary coil which are arranged in parallel each have a diode in series connecting the low sides of the coils to earth via the shunt resistor R2, R2 is used to measure the secondary current.

Any of the switches M1, M2, M3, Q1 or Q2 may be controlled by the ECU and/or spark control unit (not shown).

The circuit needs only one additional power switch instead of having two as described in WO2017/081007. The two transformers are connected symmetrically to the battery.

Figure 3B:
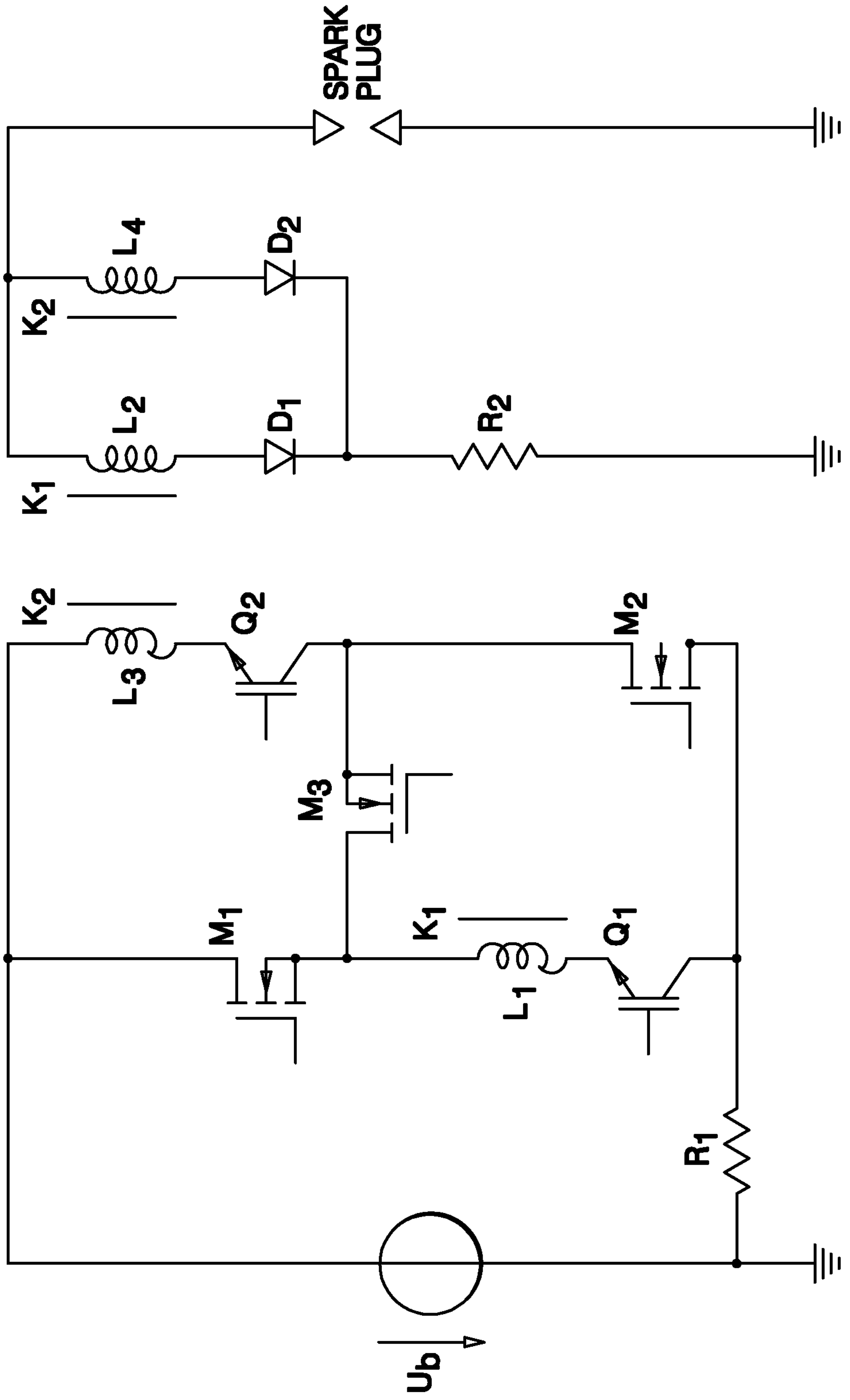
FIG. 3*b* shows an alternative example with preferred switches.

FIG. 3*b* shows an alternative example with preferred switches.

The circuits may include means to measure the voltage at the high voltage HV-diodes (D1 and D2), though this is optional, the supply voltage (Ubat) can additionally and optionally be measured.

The operation of the circuit according to the examples such as FIGS. 3*a* and 3*b* may be implemented as follows with reference to the flow charts of the drawings. Also at the end of the description is a list of the abbreviations/definitions.

A) Main Loop

Figure 4A:
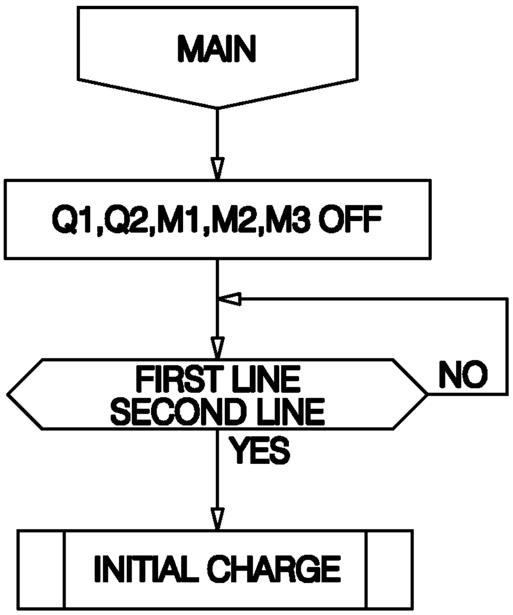
FIGS. 4*a* to 4*g* show flow charts of the methodology of operating examples in preferred embodiments.

FIG. 4*a* shows a flow chart of the main loop

At the beginning all power switches are off. The coil is waiting in a loop for the control signal (EST signal) from the ECU. When EST is high "Initial Charge" is starting. The process then proceeds to the Initial Charge process.

B) Initial Charge

Figure 4B:
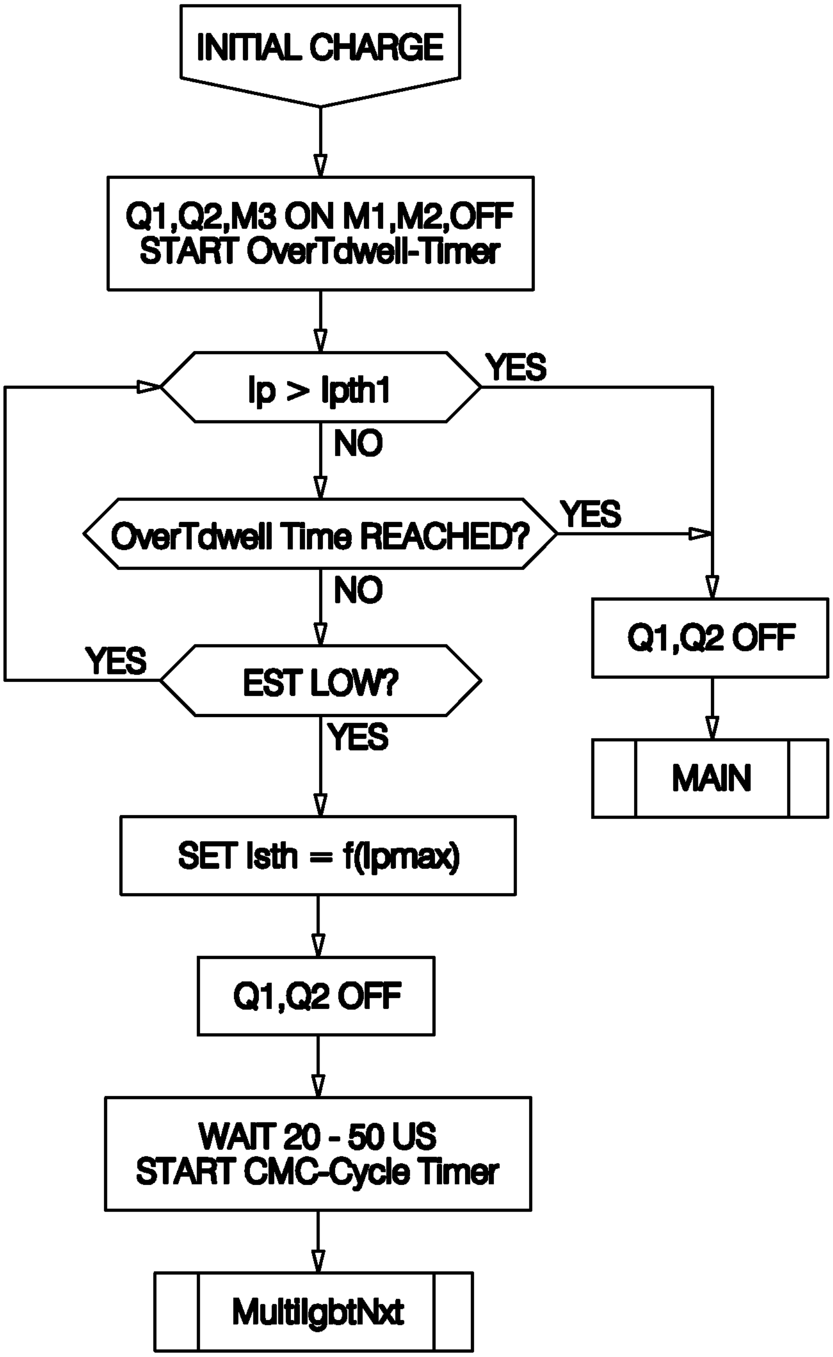

FIG. 4*b* shows a flow chart for this phase. For the initial charge both coil stages are connected in series: Q1, Q2, M3 are on: The current flows through L3, L1 and R1. With this energy is stored in both transformers. The primary current is measured via R1, if the current is too high both IGBTs are switched off as a safety feature. The Tdwell-time is detected, if the time is too high both IGBTs are switched off; this is a safety feature. Typical Tdwell time for a CMC-coil is between 600 us and 1400 us. Both transformers are charged as long as the EST-signal of the ECU is high. At the falling edge:

i) First the maximum primary current (Ipmax) is sampled and the secondary current threshold is set as a function of Ipmax. Isth=Ipmax/2/ue−dIs, whereas dIs is a value between ~30 mA to 80 mA ii) Both IGBTs Q1 and Q2 are switched off. At this time the high voltage on the secondary side is induced. The ignition spark is generated.

iii) A small delay time is needed to generate a robust spark, (20-50 us) The CMC-cycle timer is started. Typical value for the CMC-Timer is between 500 us (at high RPMs) and 15 ms (at low RPMs, e.g. cold start)

iv) Go to the next step which is "MultiIgbtNxt"

C) MultiIgbtNxt

Figure 4C:
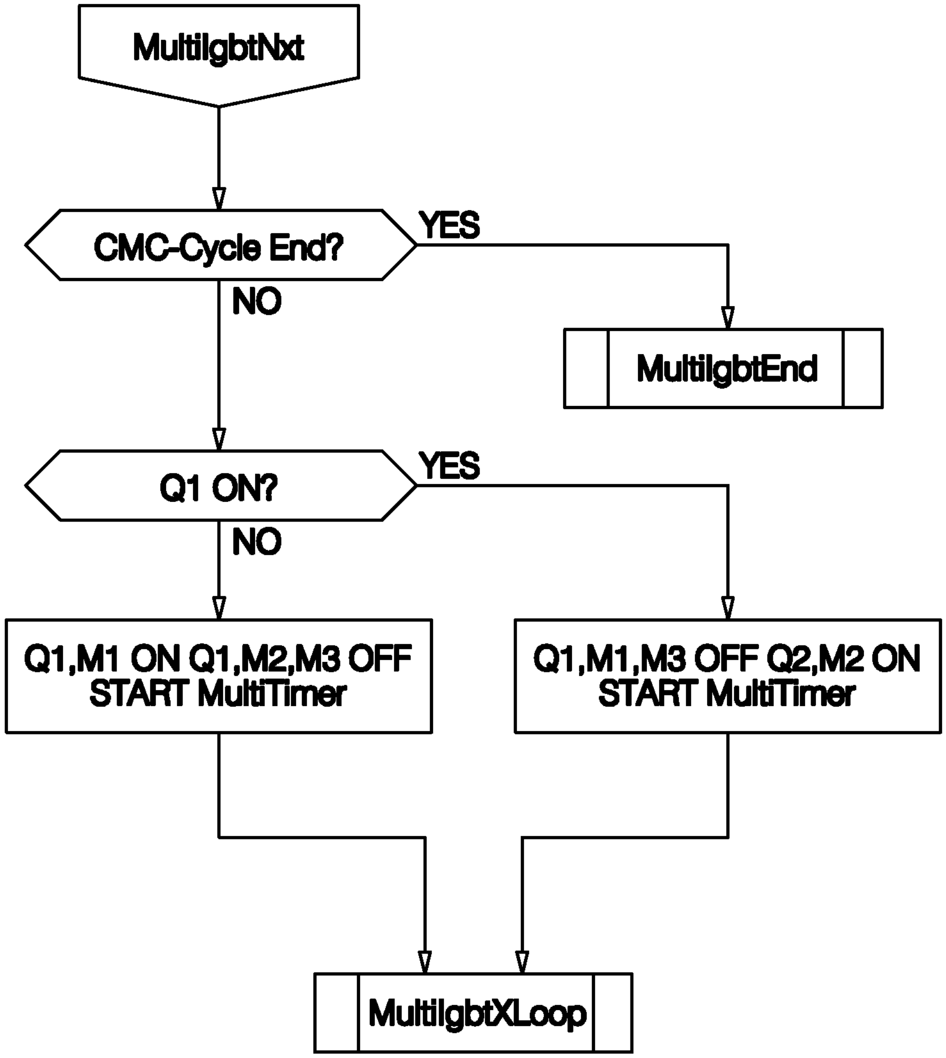
Figure 4D:
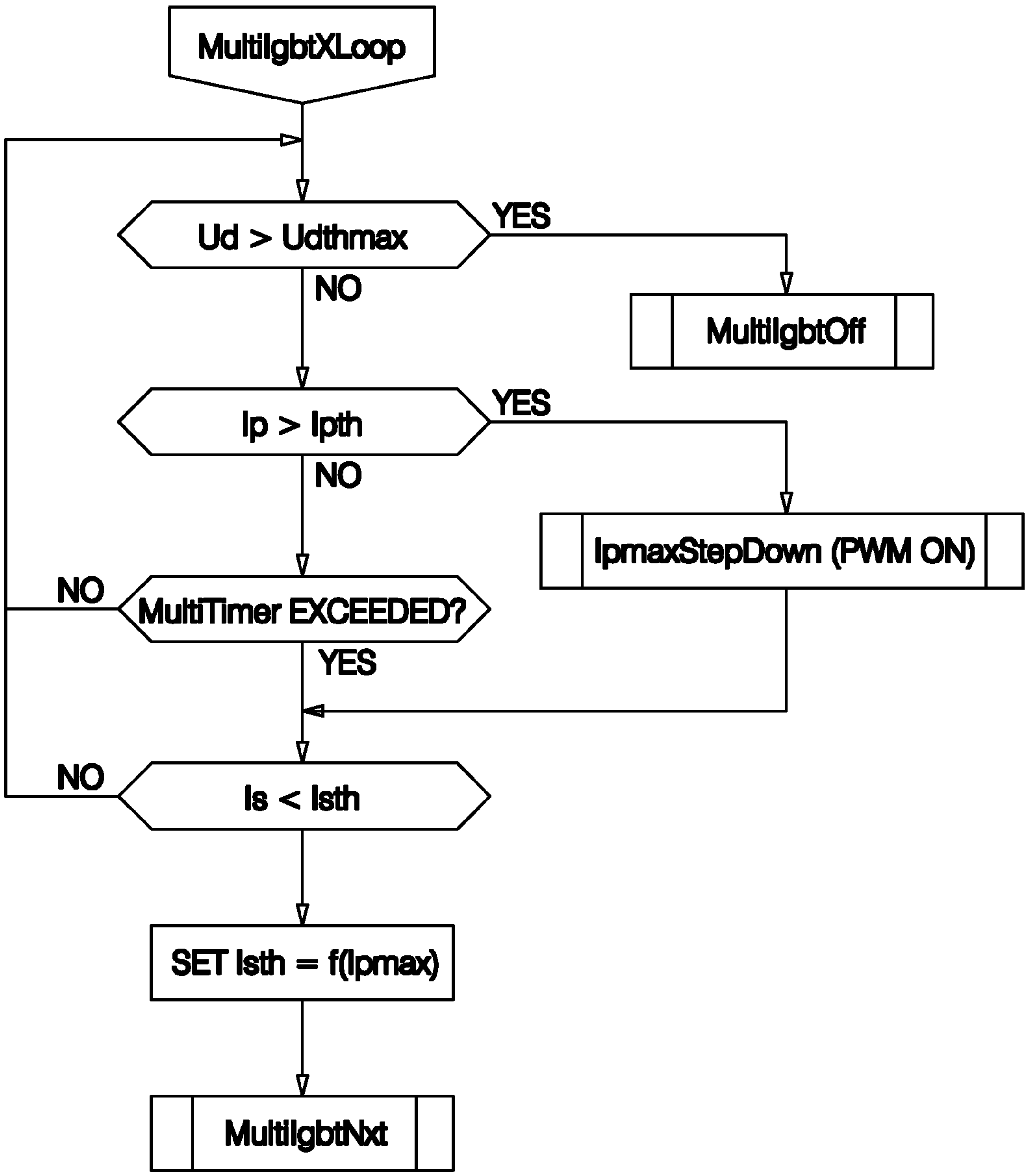
Figure 4E:
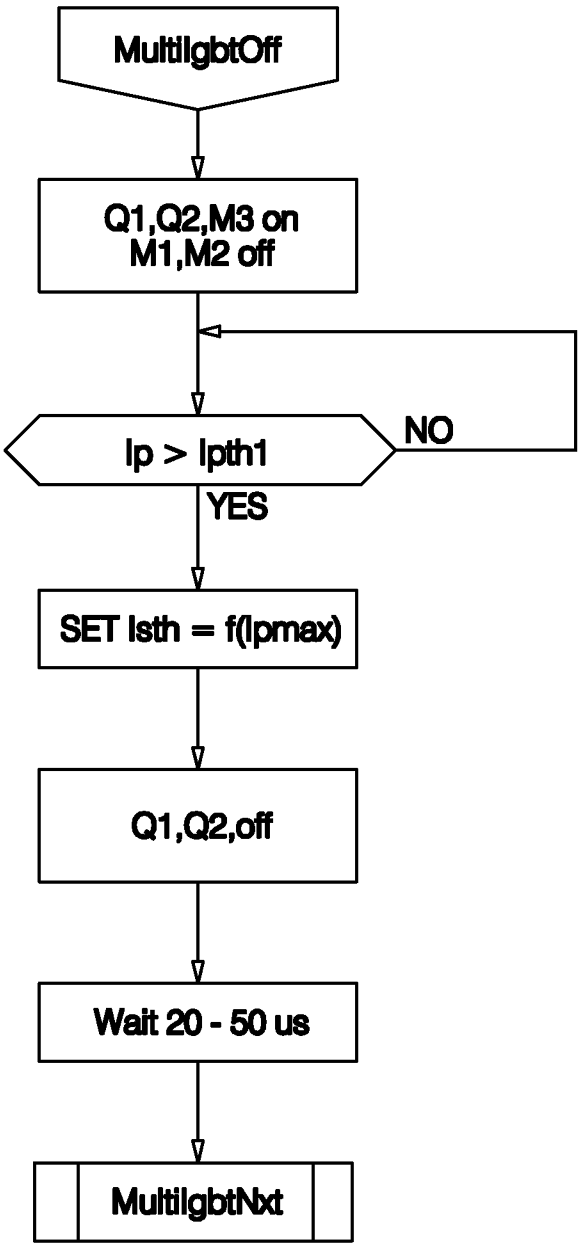
Figure 4F:
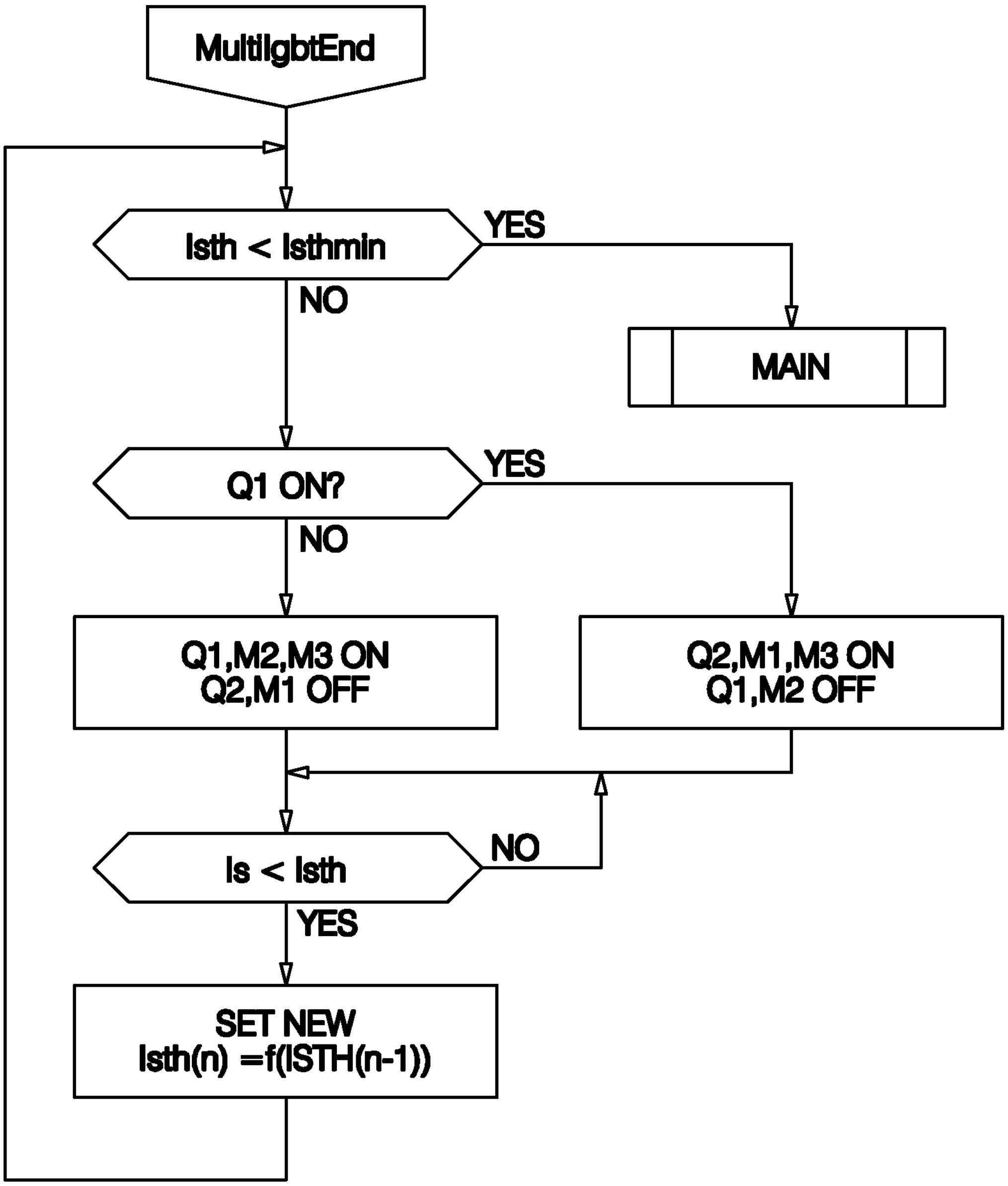
Figure 4G:
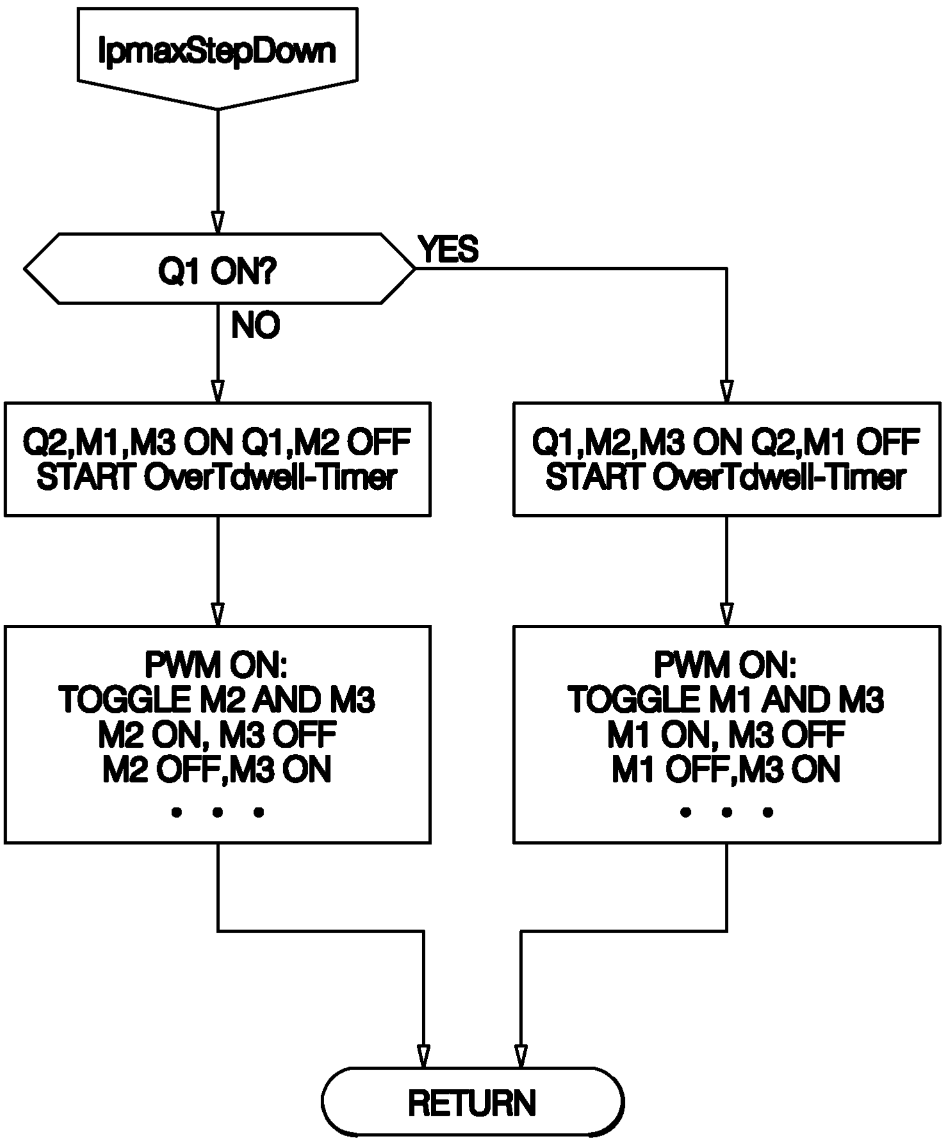

FIG. 4*c* shows a flow chart for this phase. This program section is used between each toggle cycle. The main goal of this system is to maintain a continuous secondary current and with this to toggle between two characteristic stated:

Coil 1 is charging and Coil 2 firing: Q1, M1 are on and Q2, M2, M3 are off

Coil 1 is firing and Coil 2 is charging: Q1, M1, M3 are off and Q2, M2 are on

The following steps are taken:

i) Checking if the CMC-cycle is finished. The CMC-cycle can be finished via the ECU interface or the CU of the coil via a timer (CMC-Timer), If finished go on with "MultiIgbtEnd"

ii) Needed to identify the toggling operation. Igbt Q1 is switched on? This means the first CMC-cycle starts always with the coil stage 1 iii) Two possibilities:

If Q1 was off, charge coil 1 and fire coil 2: Q1, M1 are on and Q2, M2, M3 are off. The MultiTimer is started, which is needed to limit the CMC-toggling frequency.

If Q1 was on, fire coil 1 and charge coil 2: Q1, M1, M3 are off and Q2, M2 are on. The MultiTimer is started, which is needed to limit the CMC-toggling frequency.

iv) Proceed to MultiIgbtXLoop phase

D) MultiIgbtXLoop

FIG. **4*d*** shows a flow chart of this phase. The main goal of this phase on is to measure different current and voltages and to react on it, if the corresponding value is out of range.

i) The voltage at the diode is monitored. If the voltage is too high go on with MultiIgbtOff (recharge both coils to protect the HV-diodes)

ii) Detect the primary current Ip:

a. Ip higher than IpthCMC too high proceed to "IpmaxStepDown" phase which limits the primary current, then go to step iii). The value of IpthCMC is typically in a range between 15 A and 35 A.

b. Go to step iii)

iii) Check the MultiTimer, if the timer has reached an adaptable time, then go on with step i, otherwise go on with step iv). A typical time for the MultiTimer is in the range between 80 us and 500 us.

iv) Check if the secondary current Is is below the threshold value Isth:

a. If no, go to step i)

b. If yes, go to step v) with MuliIgbtNxt (toggle coil stages)

v) The secondary current threshold Isth is set as a function of the measured maximum current Ipmax. Then go to the MuliIgbtNxt phase (toggle coil stages).

E) MultiIgbtOff

FIG. **4*e*** shows the flow chart of this phase. This phase is initiated when the voltage at the HV-diodes is too high and is needed to protect the HV-diodes of too high voltages by switching on both transformers. This is similar to the initial charge phase.

i) Both coil stages are connected in series: Q1, Q2, M3 are on and M1, M2 are off: The current flows through L3, L1 and R1. With this energy is stored in both transformers. The primary current is measured via R1.

ii) Detect primary current Ip:

a. Ip higher than Ipth1 than go to step iii). Ipth1 is in the range between 15 and 35 A.

b. Recharge both coils as long the primary current reaches the limit iii) The maximum primary current (Ipmax) is sampled and the secondary current threshold is set as a function of Ipmax. Isth=Ipmax/2/ue−dIs, whereas dIs is a value between ~30 mA to 80 mA iv) Both IGBTs Q1 and Q2 are switched off. At this time the high voltage on the secondary side is induced. The ignition spark is generated.

v) A small delay time is needed to generate a robust spark, (20-50 us)

vi) Go to the MuliIgbtNxt phase (toggle coil stages).

F) MultiIgbtEnd

FIG. **4*f*** shows a flow chart of the "MultiIgbtEnd" phase. Here the secondary current is ramped down to zero, this is needed to minimize the spark plug wear. The following steps are taken:

i) If the secondary current threshold Isth, which is used for the ramp down, is below the minimum secondary current threshold, then go on with Main (FIG. **4*a***)

ii) Which Igbt is on?

a. Q1 is off: Switch Q1, M2, M3 on and Q2, M1 off. Herewith coil 1 is firing and coil 2 is in the freewheeling mode and current flows through L3, Q2, M3, M1 b. Q1 is on: Switch Q2, M1, M3 on and Q1, M2 off. Herewith coil 2 is firing and coil 1 is in the freewheeling mode then current flows through L1, Q1, M3, M2 iii) Wait until the secondary current Is falls short of Isth, then go to step iv)

iv) The new secondary current threshold Isth(n) is set dependent on the old Isth(n−1) value: Isth(n)=Isth(n−1)−dIs, whereas dIs is in the range of 20-50 mA.

G) IpmaxStepDown

FIG. **4*g*** shows the IpmaxStepDown phase. This function/phase is needed to limit the primary current to a maximum value. In this mode the current flows in a freewheeling path and with this feature the current is limited and with this the stored energy. This function is called during CMC-cycle, where one coil is charged and the other coil is discharged/firing.

1. Which Igbt is on?

a. Q1 is off:

i. Coil 2 is switched into the step-down-mode by switching Q2, M1 and M3 on.

ii. Toggle M2 and M3 via a PWM signal the PWM signal is switched on as long as the CMC-cycle is toggled to the next stage (MultiIgbtNxt)

b. Q1 is on:

i. Coil 1 is switched into the step-down-mode by switching Q1, M2 and M3 on.

ii. Toggle M1 and M3 via a PWM signal the PWM signal is switched on as long as the CMC-cycle is toggled to the next stage (MultiIgbtNxt)

The table of FIG. 5 below shows the timing: Inside the step-down-state M1 and M3 are toggled (T), when Q1 is switched on resp. M2 and M3 when Q2 is switched on. The "MultiIgbtNxt" refers to the CM C-Mode (MultiCharge Mode)

Summary of Control

Below shows a summary of the control of switches for the salient phases a) Initially all switches are off at the beginning, whereas it is only important here that no power current flows into the circuit (no closed circuit) Q1 Q2 M1 M2 M3—all off b) For the initial ramp up we are switching Q1/Q2/M3 on, M1/M2 off (start over Tdwell-Timer)

c) Then we are switching all switches off, whereas the most important one are Q1 and Q2, these must be off. The other ones must be switched in that way, that there is no short circuit.

d) For the CMC-Mode, the switches move from (between): Q1/M1 on, Q2/M2/M3 off and Q1/M1/M3 off, Q2, M2 on

L1—Primary inductance coil 1

L2—Secondary inductance coil 1

L3—Primary inductance coil 2

L4—Secondary inductance coil 2
K1—Magnetic coupling factor coil 1
K2—Magnetic coupling factor coil 2
R1—Primary current shunt resistor
R2—Primary current shunt resistor
Q1—IGBT for coil stage 1
Q2—IGBT for coil stage 2
D1—High voltage diode coil 1
D2—High voltage diode coil 2
M1—Power switch (MOSFET), step down switch coil 2
M2—Power switch (MOSFET), step down switch coil 1
M3—Power switch (MOSFET), series connection and step down switch
ue—winding ratio, between secondary and primary winding
Ub—Battery voltage
Us—Secondary voltage, spark plug voltage
Ud—High voltage diode voltage
$U_{dthmax}$—High voltage diode switching threshold voltage
ECU—Engine Control Unit
EST—Engine Spark Timing, common name for the control signal coming from the ECU
CU—Control Unit of the ignition coil
CMC—Coupled MultiCharge Ignition
Ipth—Primary current switching threshold in CMC
Ipth1—Primary current switching threshold during the initial charge
Isth—Secondary current switching threshold in CMC
Ipmax—Maximum primary current peak after initial charge
Ipthmax—Maximum primary current switching threshold in step-down-operation
PWM—Pulse Width Modulation

DESCRIPTION OF THE INVENTION

The HV-diodes D1 and D2 have a breakdown voltage of ~7 kV. The voltage at the diodes must be measured to avoid any damage to these diodes. Via the measurement of the voltage the control circuit can react to excessive voltages and limit the voltage at the diodes by switching the power semiconductors on the primary side.

This can be achieved—meaning:

1. By discharging the transformers, Q1 and Q2 must be switched off. This conducts the diodes with the remaining energy in both transformers in forward direction.
2. By recharging both transformers to switch both diodes in the non-conductive (off state)—in this state the diodes are seeing only a voltage of Ub*ue~2 kV:
   a. By switching Q1, Q2, M3 on and M1, M2 off
   b. By switching M1, Q1, M2, Q2 on and M3 off
3. By recharging one transformer and switching the other one into a freewheeling state (not preferred option):
   a. By switching Q1, Q2, M2, M3, Q1 on and M1 off
   b. By switching Q1, Q2, M1, M3 on and M2 off A high voltage at the diodes can occur for instance if the ignition spark is blown out by turbulence inside the ignition chamber.

FIG. 6 shows again the prior art circuitry where like reference notations s denote the same components as before. The dashed boxes shows the transformer cavity and so shows those components within the cavity.

As can be seen there are two diode resistors RD1 and RD2, electrically connected at one end to the respective coils L2 and L4 and each having connections 202*a* and 202*b* for connection to electronics/or for control purposes to measure the voltage at the diodes. So there are required resistors RD1 and RD2 which are the high voltage resistors sitting inside epoxy and have to be specially connected to the electronic circuitry.

Figure 6:
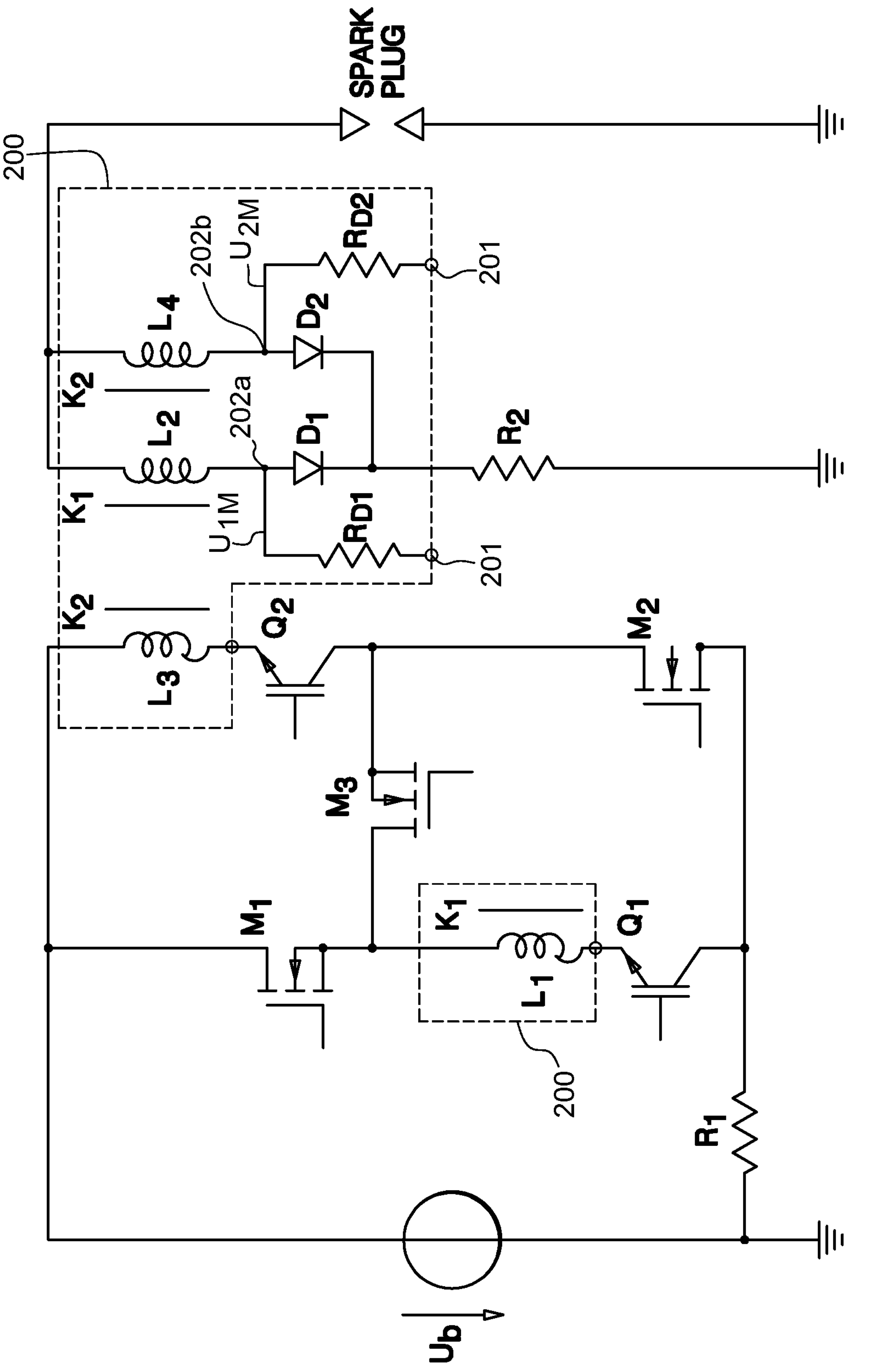
FIG. 6 shows again the prior art showing the diode resistors.

As mentioned this direct measurement requires high voltage resistors, that must be placed inside epoxy and must be accessed via connections to the electronic assembly board. It is not ideal for such resistors to be located in hard epoxy resin, which makes them liable to the risk of failure. A further disadvantage is that production of the circuitry requires an additional process step in production. In addition it requires two additional connections 202*a/b* between the electronics and the transformer. In FIG. 6 it should be noted that terminals (connections) on components which are already present before an assembly/manufacturing stage are shown by small hollow circles and connections which need to be make bespoke for the circuitry are shown as full small circles.

Figure 7:
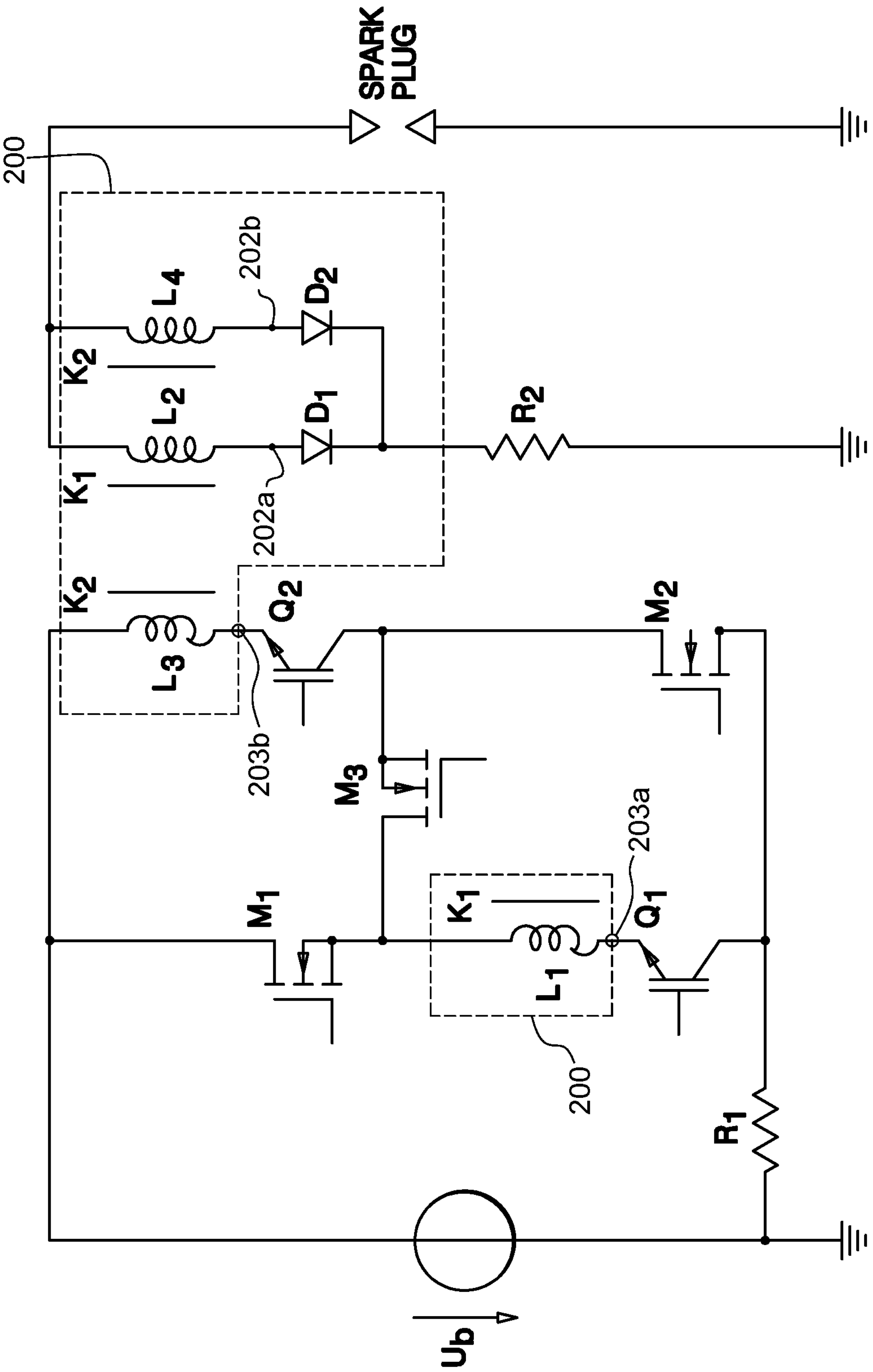
FIG. 7 shows an example of the invention.

In examples of the invention, instead of measuring the voltage directly at the diodes, the voltage is determined indirectly via measured (secondary) voltage at the e.g. collector terminal of the IGBT's Q1 and Q2; points 203*a* and 203*b* of FIG. 7. FIG. 7 shows circuitry according to one example of the invention. It is similar to the prior art circuitry of FIG. 6 except that the diode resistors Rd1 and Rd2 are omitted along with the necessary for terminal connections therefor.

Instead voltages are measured at points 203*a* and 203*b* which is at the collector terminals of Q1 and Q2 respectively.

Fortuitously there are already present connector points/terminal at these two points 203*a* and 203*b*, and in examples these two points are connected to additional circuitry provided (not shown) where the voltages can be compared with e.g. appropriate threshold values (by e,g. comparator means) to determine if there is too high a voltage at the diodes D1 and D2 (at the equivalent points 202*a* and 202*b*).

So, in other words, lines from these connection points are provided and connected to means to measure the voltage at these points. It should be noted that in the figure connection points denoted with a hollow circle are connection points which already exist in the circuitry i.e. there are already present connection terminals, so the for the connection wires or lines to the voltage measurement circuitry can be easily made.

The voltages at points 203*a* and 203*b* (which are measured/compared with thresholds are designated $U_{CMQ1}$ and $U_{CMQ2}$.)

Measurement of voltage at these points can be used to determine or infer voltages at points 202*a* and 202*b*. The voltages measure at these points can be compared with threshold values and the threshold values to which $U_{CMQ1}$ and $U_{CMQ2}$ are set accordingly. The skilled person would be aware of the relationships between the voltage at the points 202*a,b*, and points 203*a,b* in order to determine suitable thresholds e.g. as follows $$U_{CMQn}=Ub_{urn}/ue+UB$$

$$U_{nM}=U_B*ue+Us(n=1,2)$$

Where Us=secondary voltage at the spark plug $Un_M$ is voltage at appropriate high voltage diode (n=diodes 1,2);

ue winding ratio between secondary and primary windings.

In examples the value $U_{dthmax}$=high voltage diode switching threshold.

In CMC operation $U_{CMQ1}$ can be measured when transformer T1(L1/L2) is discharging and $U_{CMQ2}$ is measured, when transformer T2 (L2/L4) is discharging.

If the measured voltage $U_{CMQ1}$ or $U_{CMQ2}$ is higher than a threshold this may be set at or near to a value of Udthmax/ue), then the control of the system is such that both transformers are recharged, both discharged or one is recharged and the other is in a freewheeling state, —e.g. the multi IGBOff event as described above.

1. Controlling such that both transformers are recharged can be realised by the following options By discharging the transformers, Q1 and Q2 must be switched off. This conducts the diodes with the remaining energy in both transformers in forward direction. M1/M2M3 may be in any state.
2. By recharging both transformers to switch both diodes in the non-conductive (off state)—in this state the diodes are seeing only a voltage of Ub*ue~2 kV:
   a. By switching Q1, Q2, M3 on and M1, M2 off
   b. By switching M1, Q1, M2, Q2 on and M3 off
3. By recharging one transformer and switching the other one into a freewheeling state (not preferred option):
   a) by switching Q1, Q2, M2, M3 on and M1 off
   b) by switching Q1, Q2, M1, M3 on and M2 off So to summarise; the possibilities to discharge the transformers:

1) Q1 and 02 off, all other switches can be open or closed (preferred way)
2) Q1 off, all other switches can be open or closed (disadvantage: the reflected voltage of both transformers is accumulated)
3) Q1 and M2 is open, all other switches can be open or closed (disadvantage: M2 must withstand a higher voltage, several hundred instead of ~40 V.

Whereas a short circuit must be avoided: M1, M2, M3 cannot be closed at the same time.

The adjustable threshold voltage may be adjusted to a appropriate/equivalent threshold value which is in the range of the breakdown voltage of the HV diodes D1 and D2. At a battery voltage of 14V the breakdown voltage of the diodes are in the range of about 7 kV.

Figure 8:
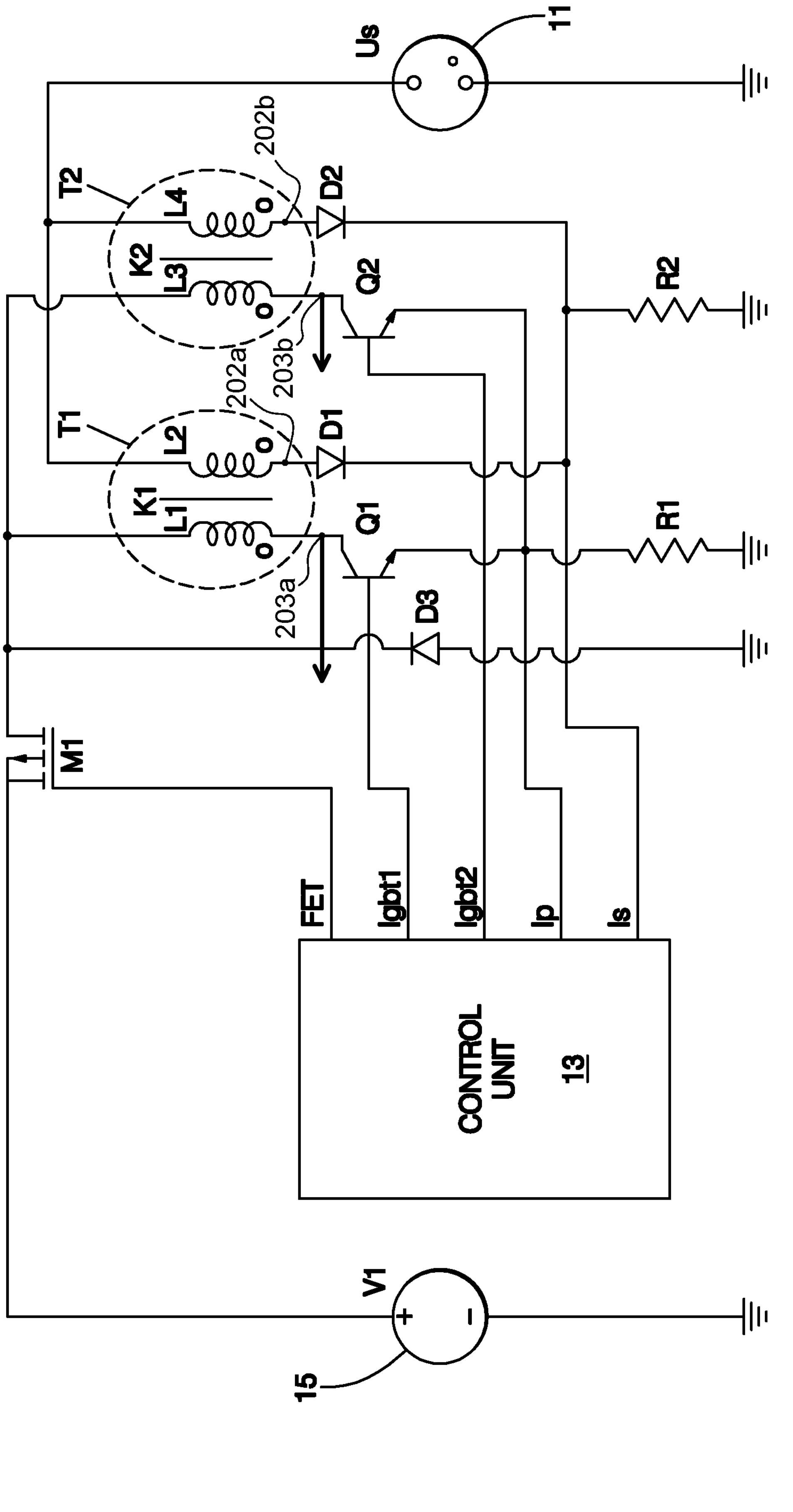
FIG. 8 shows a further example of the invention.

The idea of the invention can also be applied to the standard prior art circuitry such as that in FIG. 1. FIG. 1 circuitry would also include diode resistors connected to points between L2 and D1 and also between L4 and D2 (not shown in FIG. 1). FIG. 8 shows an example of the invention where the circuitry is generally identical to figure to FIG. 1 with like numbered components. There are lines emanating from connection points 203*a* and 203*b*, to voltage measurement circuitry (not shown), shown by thick arrows. Point 203*a* is located electrically between the transistors (collector thereof) Q1 and the low side of L1; and point 203*b* is located electrically between the transistor (collector thereof) Q2 and low side of L3, similar to that of FIG. 7.

Again, the voltages at points 203*a* and 203*b* are designated $U_{CMQ1}$ and $U_{CMQ2}$. Measurement of voltage at these points can be used to determine or infer voltages at points 202*a* and 202*b*. The voltages measured at these point 203*a* and 203*b* s can be compared with threshold values and the threshold values set accordingly. The skilled person would be aware of the relationships between the voltage at the points 202*a,b*, and points 203*a,b* in order to determine suitable thresholds as before.

So in summary again in operation, voltage is measured to if at any stage if the measured voltage is higher than a threshold (this may be set at or near to a value of Udthmax/ue), then by switching the power semiconductors on the primary side the voltage at the diodes can be limited: This can be achieved by the following options:

1) Discharging the transformers:
   a. Q1 and Q2 are off
2) Recharging the transformers:
   a. Q1, Q2 and M1 is on
3) Freewheeling the transformers:
   a. Q1, Q2, D3 is on and M1 off If the toggling of the transformer occurs (MultiIgbNxt as described above) then a minimum blank time is required, after this blank time the diode voltage is checked in the control loop. This blank time is need to blank out the voltage spikes induced by the toggling process (leakage inductance of the transformers) The require blank time is in the range of 10-20 microseconds. During the blank time all the switches remain untouched, meaning the transformers are toggled, the blank time starts, during this time no analogue value (Ud, Ip, Is) is checked.

The indirect measurement overcomes the problems described above and saves some components/connection. There are no HV diode resistor required; two connections to the electronic board are redundant; on the circuit board similar number of components are needed for detection.

Both measurements methods (direct/indirect) require some altering of the signal, therefore with both methods the used HV-diodes require some avalanche capability. Due to the additional (parasitic) nature of the transformer the delay time can lead to a longer avalanche time at the HV-diodes, this can lead to a higher power dissipation inside the diodes.

The invention claimed is:

1. A multi-charge ignition system including a spark plug control unit (13) adapted to control at least two coil stages so as to successively energise and de-energise said coil stage(s) to provide a current to a spark plug, said two stages comprising a first transformer (T1) including a first primary winding (L1) inductively coupled to a first secondary winding (L2); a second transformer (T2) including a second primary winding (L3) inductively coupled to a second secondary winding (L4); a first switch Q1 electrically connected between the low side of the first primary winding L1 and the low side/earth, a second switch Q2 having a connection to the low side of the second primary winding L3; and including a first diode D1 electrically connected between the low side of said first secondary winding L2 and ground, and a second diode D2 connected to a point between the low side of said second secondary winding L4 and ground and, including means to measure the voltage at a first connection point (203*a*) between the first switch and the low side of the first primary winding L1 and/or the voltage at a second connection (203*b*) point between the second switch and the low side of the second primary winding L3; and means to control the operation of the system dependent upon said measured voltages;

wherein either or both of said connection point is connected to comparator means, said comparator means being adapted to compare the voltages at said first and/or second connection points with threshold values; where said threshold value(s) are in a region of Udthmax/ue), where ue is ue winding ratio between secondary and primary windings of the corresponding transformer to which the corresponding diode is directly connected to, and $U_{dthmax}$=high voltage diode switching threshold of that diode.

2. A system as claimed in claim 1 including comparator means adapted to compare the voltages at said first and/or second connection points with threshold values.

3. A system as claimed in claim 1 wherein said first switch comprises a first transistor Q1, a collector and emitter of which are connected between the low side of L1 and ground.

4. A system as claimed in claim 3 where said second switch comprises a second transistor, a collector and emitter of which are connected between the low side of L3 and ground.

5. A system as claimed in claim 4 wherein the collector of said first transistor is connected to said low side of L1, said first connection point being located therebetween, and/or the collector of said second transistor is connected to said low side of L3, said second connection point being located therebetween.

6. A system as claimed in claim 1 wherein said second switch Q2 is connected between the low side of L3 and a control unit.

7. A system as claimed in claim 1 either or both of said connection point is connected to comparator means.

8. A system as claimed in claim 7 where said comparator means is adapted to compare the voltages at said first and/or second connection points with threshold values.

9. A system as claimed in claim 1 including a third switch M1 connected between a power supply and a high side of the first primary winding L1.

10. A system as claimed in claim 9 including a fourth switch M2 electrically connected between the second switch and ground, and a fifth switch M3 electrically connected between a point between the second switch Q2 and the fourth switch M2, and a point between third switch M1 and the high side of said first primary coil.

11. A system as claimed in claim 1 configured such that if the measured voltage at one or more of said first or second connection points is higher than a threshold, the system is configured to perform any of: recharge one or both transformers; discharge one or both transformers; recharge/discharge one transformer and put the other in a freewheeling state; put both transformed into a freewheeling state.

12. A method of controlling a multi-charge ignition system, said system including a spark plug control unit adapted to control at least two coil stages so as to successively energise and de-energise said coil stage(s) to provide a current to a spark plug, said two stages comprising a first transformer (T1) including a first primary winding (L1) inductively coupled to a first secondary winding (L2); a second transformer (T2) including a second primary winding (L3) inductively coupled to a second secondary winding (L4); a first switch Q1 electrically connected between the low side of the first primary winding L1 and low side/earth, a second switch Q2 connected to the low side of the second primary winding L3; and including a first diode D1 located between the low side of said first secondary winding L2 and ground; and a second diode D2 connected to a point between the low side of said second secondary winding L4 and ground and, said method comprising:

a) measuring the voltage at a first connection point (**203*a*) between the first switch and the low side of L1 and/or the voltage at a second connection point (203*b***) between the second switch and the low side of L3, wherein step a) is implemented during CMC mode only after a pre-set blank time after toggling of the transformer occurs; and b) controlling the operation of the system dependent upon said measured voltages.

13. A method as claimed in claim 12 including the step of comparing the voltages at said first and/or second connection points with threshold values.

14. A method as claimed in claim 12 wherein said first switch comprises a first transistor, the collector and emitter of which are connected between the low side of L1 and ground.

15. A method as claimed in claim 12 where said second switch comprises a second transistor, the collector and emitter of which are connected between the low side of L3 and ground.

16. A method as claimed in claim 12 wherein the collector of said first transistor is connected to said low side of L1, said first connection point being located therebetween, and/or the collector of said second transistor is connected to said low side of L3, said second connection point being located therebetween.

17. A method as claimed in claim 12, wherein said second switch Q2 is connected between the low side of L3 and a control unit.

18. A method as claimed in claim 12 including a third switch M1 connected between a battery and the high side of the first primary winding L1.

19. A method as claimed in claim 12 including a fourth switch M2 located between the second switch and ground, and a fifth switch M3 electrically connected between a point between the second switch Q2 and the fourth switch M2, and a point between third switch M1 and the high side of said first primary coil.

20. A method as claimed in claim 12 wherein step b) comprises determining if the measured voltage at one or more of said first or second connection points is higher than said threshold, then controlling the system to perform any of: recharge one or both transformers; discharge one or both transformers; recharge/discharge one transformer and put the other in a freewheeling state; put both transformed into a freewheeling state.

21. A method of controlling a multi-charge ignition system, said system including a spark plug control unit adapted to control at least two coil stages so as to successively energise and de-energise said coil stage(s) to provide a current to a spark plug, said two stages comprising a first transformer (T1) including a first primary winding (L1) inductively coupled to a first secondary winding (L2); a second transformer (T2) including a second primary winding (L3) inductively coupled to a second secondary winding (L4); a first switch Q1 electrically connected between the low side of the first primary winding L1 and low side/earth, a second switch Q2 connected to the low side of the second primary winding L3; and including a first diode D1 located between the low side of said first secondary winding L2 and ground; and a second diode D2 connected to a point between the low side of said second secondary winding L4 and ground, where said threshold value(s) are in the region of Udthmax/ue), where ue is ue winding ratio between secondary and primary windings of the corresponding transformer to which the corresponding diode is directly connected to, and $U_{dthmax}$=high voltage diode switching threshold of that diode; and, said method comprising:

a) measuring the voltage at a first connection point (**203*a*) between the first switch and the low side of L1 and/or the voltage at a second connection point (203*b***) between the second switch and the low side of L3; and b) controlling the operation of the system dependent upon said measured voltages.

* * * * *